(12) United States Patent
Zhang et al.

(10) Patent No.: US 9,733,826 B2
(45) Date of Patent: Aug. 15, 2017

(54) INTERACTING WITH APPLICATION BENEATH TRANSPARENT LAYER

(71) Applicant: Lenovo (Singapore) Pte. Ltd., Singapore (SG)

(72) Inventors: Jianbang Zhang, Cary, NC (US); Scott E. Kelso, Cary, NC (US); John W. Nicholson, Cary, NC (US); Steven R. Perrin, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 332 days.

(21) Appl. No.: 14/570,184

(22) Filed: Dec. 15, 2014

(65) Prior Publication Data

US 2016/0170632 A1 Jun. 16, 2016

(51) Int. Cl.
*G06F 3/041* (2006.01)
*G06F 3/0488* (2013.01)

(52) U.S. Cl.
CPC ........ *G06F 3/04883* (2013.01); *G06F 3/0488* (2013.01); *G06F 3/04886* (2013.01)

(58) Field of Classification Search
None
See application file for complete search history.

(56) References Cited

U.S. PATENT DOCUMENTS

| | | | |
|---|---|---|---|
| 5,592,608 A * | 1/1997 | Weber | G06F 17/30259 707/E17.024 |
| 5,677,710 A * | 10/1997 | Thompson-Rohrlich | G06F 3/04883 345/173 |
| 6,938,221 B2 * | 8/2005 | Nguyen | G06F 3/04883 345/173 |
| 7,096,432 B2 * | 8/2006 | Huapaya | G06F 3/0481 382/188 |
| 9,423,908 B2 | 8/2016 | Zhang et al. | |
| 2003/0026675 A1 * | 2/2003 | McGovern | F16B 5/0275 411/412 |
| 2003/0071850 A1 * | 4/2003 | Geidl | G06F 3/0481 715/781 |
| 2004/0070573 A1 | 4/2004 | Graham | |
| 2004/0196255 A1 * | 10/2004 | Cheng | G06F 3/0488 345/104 |

(Continued)

OTHER PUBLICATIONS

Office Action for U.S. Appl. No. 14/570,262, U.S. Patent and Trademark Office, mailed Mar. 22, 2016, 20 pages.

(Continued)

*Primary Examiner* — Kent Chang
*Assistant Examiner* — Benjamin Morales Fernande
(74) *Attorney, Agent, or Firm* — VanLeeuwen & VanLeeuwen; Carlos Munoz-Bustamante

(57) ABSTRACT

An approach is provided for directing input received at a touch-enabled device to an intended input layer. User inputs are received at a touch-screen of a device. Each user input includes a set of one or more input properties. The touch-screen includes different interaction layers that include a transparent layer and an application layer. The approach analyzes the input properties associated with the received user inputs. Based on the analysis, the approach identifies an intended interaction layer as being either the transparent layer or the application layer. The approach then directs the user inputs to the identified intended interaction layer.

20 Claims, 8 Drawing Sheets

(56) References Cited

U.S. PATENT DOCUMENTS

| | | | | |
|---|---|---|---|---|
| 2006/0242607 A1* | 10/2006 | Hudson | ............... | G06F 3/04817 715/863 |
| 2007/0242056 A1* | 10/2007 | Engelhardt | ........... | G06F 3/0416 345/173 |
| 2008/0046837 A1* | 2/2008 | Beauchamp | .......... | G06F 3/0481 715/804 |
| 2012/0262407 A1* | 10/2012 | Hinckley | ................ | G06F 3/038 345/173 |
| 2012/0287062 A1* | 11/2012 | Akiyama | ............ | G06F 3/04883 345/173 |
| 2012/0306749 A1* | 12/2012 | Liu | ....................... | G06F 3/0488 345/163 |
| 2014/0035845 A1* | 1/2014 | Kameyama | ............. | G06F 3/041 345/173 |
| 2015/0002424 A1 | 1/2015 | Yamamoto | | |
| 2015/0116226 A1* | 4/2015 | Goins | ................ | G06K 9/00402 345/173 |
| 2015/0127681 A1* | 5/2015 | Lee | ..................... | G06F 3/04883 707/772 |
| 2015/0145820 A1* | 5/2015 | Huang | .................... | G06F 3/044 345/174 |

OTHER PUBLICATIONS

Notice of Allowance for U.S. Appl. No. 14/570,262, U.S. Patent and Trademark Office, mailed Jun. 29, 2016, 8 pages.

\* cited by examiner (top view)

(side view)

INTERACTING WITH APPLICATION BENEATH TRANSPARENT LAYER

BACKGROUND

Transparent layer is topmost layer for transparent input methods on hand held devices. An input method editor (IME) is an application that allows any data, such as keyboard strokes or mouse movements, to be received as input. In this way users can enter characters and symbols not found on their input devices. Using an input method is needed for languages that have more graphemes (e.g., characters, etc.) than there are keys on the keyboard. For example, users of Latin keyboards or touch-enabled devices can input Chinese, Japanese, Korean and Indic characters.

A challenge of using the transparent layer where the IME operates, is that in traditional implementations the IME is not user friendly and users have difficulty selecting the IME or the applications below the transparent layer. For example, one traditional approach requires the user to minimize the transparent window (IME) in order to interact with apps. Because the transparent layer is transparent, it is difficult for users to ascertain if the transparent window is minimized or is still on the screen, residing between the user's inputs and the applications that appear below the transparent layer.

SUMMARY

An approach is provided for directing input received at a touch-enabled device to an intended input layer. User inputs are received at a touch-screen of a device. Each user input includes a set of one or more input properties. The touch-screen includes different interaction layers that include a transparent layer and an application layer. The approach analyzes the input properties associated with the received user inputs. Based on the analysis, the approach identifies an intended interaction layer as being either the transparent layer or the application layer. The approach then directs the user inputs to the identified intended interaction layer.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

Figure 1:
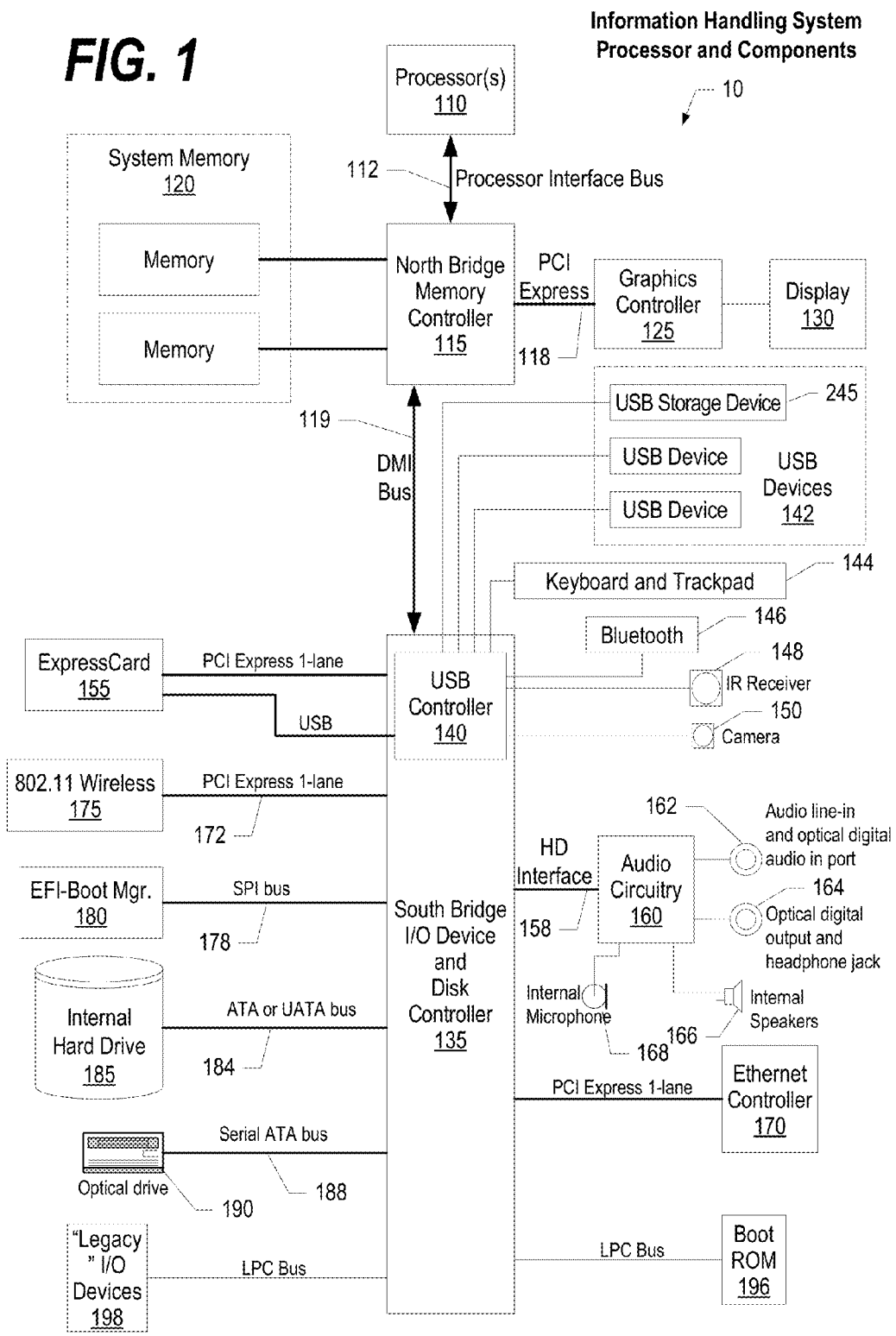
FIG. 1 is a block diagram of a data processing system in which the methods described herein can be implemented.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
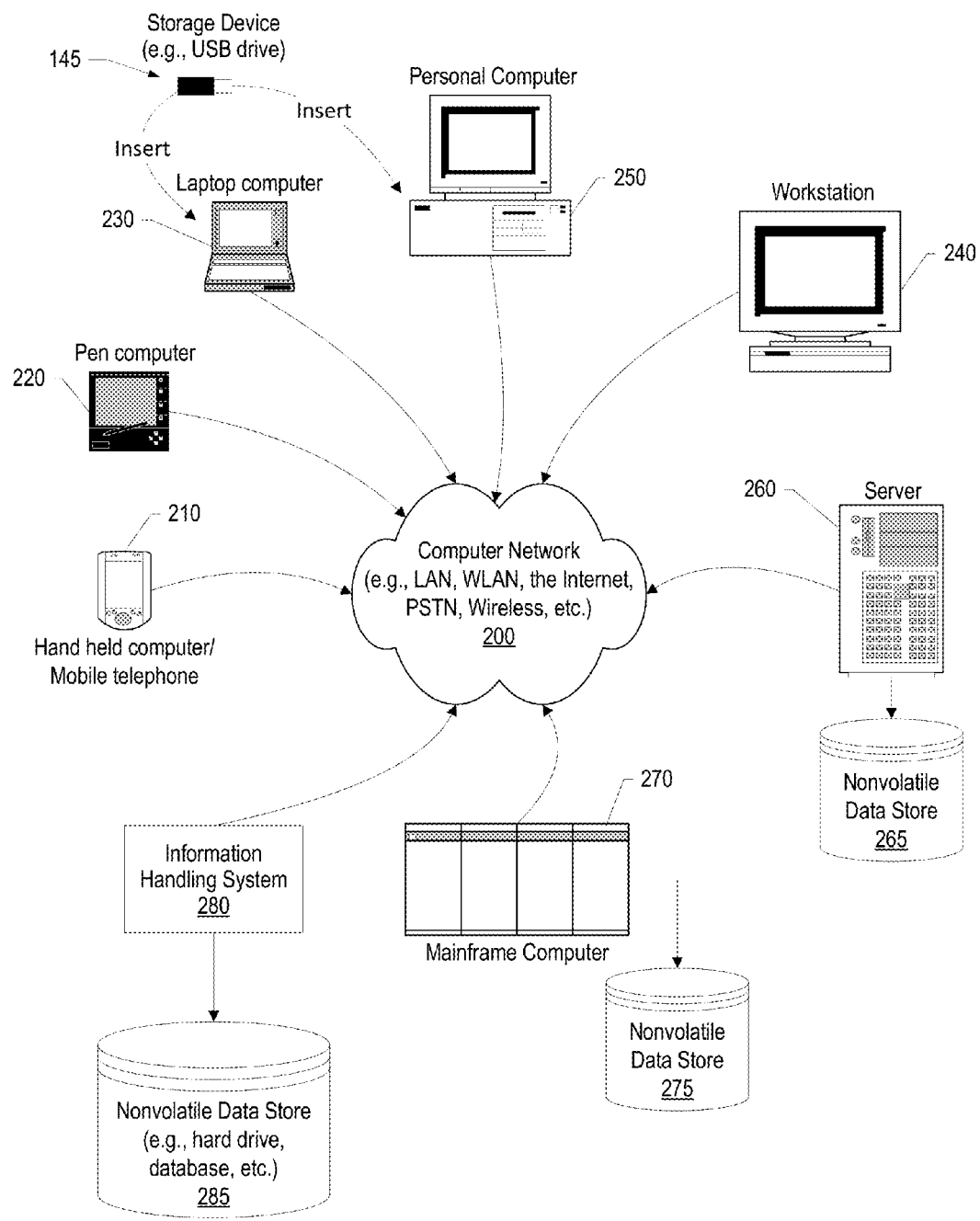
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3-8 show an approach that both identifies a user's intended interaction layer (the transparent layer or the application layer) as well as the user's intended input type (a gesture or handwriting). The transparent layer enables users to write on top of any applications or windows and send the recognized text to the appropriate text input fields or document areas. However, while users are writing, they also want the ability to control the app below such as scrolling, clicking button, etc. Weighting properties of the user input determines the intended interaction layer as well as the intended input type.

For the intended interaction layer, the approach filters motion events directly based upon the event source type. For example, if pen-type events can be distinguished from finger, mouse or others, let all the events other than pen be processed by application below. The non-pen events may directly reach the target application, or consumed by transparent layer first and re injected afterwards. If pen hover events are not used by transparent layer, it should be also filtered. Pen events are monitor continuously. For single pen stroke, if the start point or majorities of the points coordinates are beyond certain decision point or threshold, this stroke can be totally or partially treated as interaction with application below rather than handwriting input. The decision point or threshold could be 2D Euclid distance from text input region boundary to the point coordinates. The history events will be stored for later possible injection. The handwriting input event will be erased and thus will not be injected to application. For multiple continuous pen strokes, the relationship between earlier and later strokes may help to decide and correct the decision made already. For example, for several strokes created with very little time difference, if the later strokes are treated as handwriting, the earlier ones will gain a higher possibility to be handwriting as well even it was treated as app interaction. Further, the approach analyzes touch gestures which are common for app interactions such as single tap, long press and etc.

Transparent IME (transparent layer) is a model that user can use ink strokes such as circle, strikethrough and so on to act on the typeset in text input areas. Besides handwriting shapes, other direct touch gesture such as single tap can be used as command as well. For example, user may wish to write an "o" instead of a circle gesture, a "-" instead of a strike through gesture or a "." instead of a single tap gesture.

Handwriting and gesture inputs have different meanings based on context. Context could be the content below the user input. For example, if there are typeset below, this user input is more likely to be a gesture, or if there is a button below, it is more likes to be a gesture. For single tap input, if the tap point geometry is within certain distance threshold from the cursor position, it is more likes to be a period input. If the user input shape size is small, it is less possible to be a gesture, and more likely to be handwriting. If there is little time between user inputs, it is more likely a continuous handwriting input, thus less possible to be a gesture type input. By comparing the recognition results and confident score between before applying the inputs, the user inputs can be identified as either a gesture or handwriting. The comparison could also happen after applying the recognition and send the text results to the input field, if the new input makes overall content more logical, it is more likely to be a handwriting input. For gestures, the gesture probability weight is adjusted based on the prior user inputs. By continuously monitoring the user inputs, the latest user inputs may gain different probability weight to treat as gesture or handwriting. If the user input direction is opposite from the normal handwriting, it is more likely to be a gesture, such as right to left strikethrough gesture.

Figure 3A:
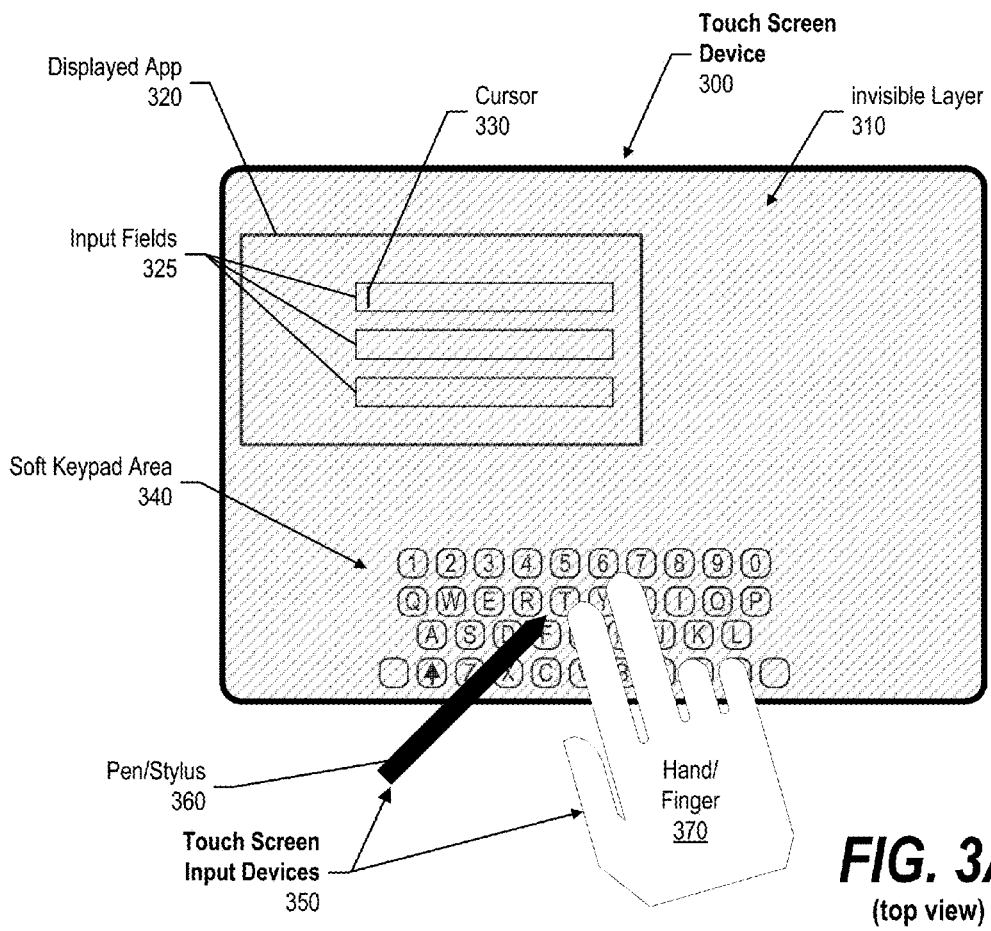
FIG. 3A is a top view diagram depicting finger-based and pen-based inputs for handwriting and typing to both the application layer and the transparent layer.

FIG. 3A is a top view diagram depicting finger-based and pen-based inputs for handwriting and typing to both the application layer and the transparent layer. Touch screen device has a touch screen surface onto which a user can input handwriting and gestures using a variety of input device 350, including finger 370 and pen-type implement 360.

Transparent layer 310 is shown as a virtual "cover" over the touch-screen surface. The user can interact with the transparent layer 310 using the touch screen input devices 350 using a variety of gestures and, in some cases, handwriting, inputs. Below transparent layer 310 is an application where one or more applications 320 might reside. Unlike transparent layer 310, applications 320 are visible to the user on the surface of touch screen device 300. Input fields 325 may be present in displayed app 320 depending on the type of app that is displayed. In addition, cursor 330 that indicates where inputted text will be placed on the screen may be a visible component on the surface of touch screen device 300. In the example shown, the cursor is presently in one of the input fields of the displayed app. Soft keypad 340 may appear based upon the apps displayed in the application layer or if textual input is requested by the transparent layer. When visible, user input directed at the keys of the soft keypad area will cause entry of the corresponding character similar to the effect of pressing a character on a physical keyboard.

Figure 3B:
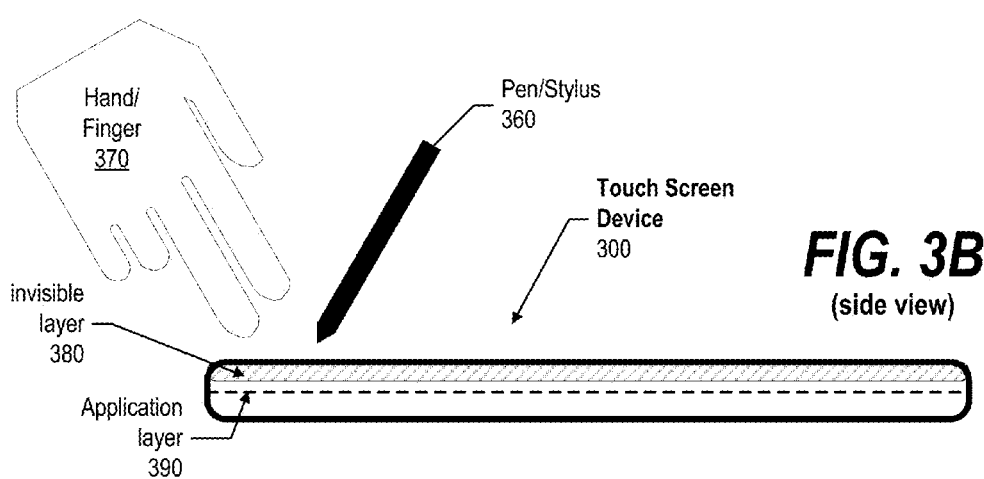
FIG. 3B is a side view diagram depicting finger-based and pen-based inputs for handwriting and typing to both the application layer and the transparent layer.

FIG. 3B is a side view diagram depicting finger-based and pen-based inputs for handwriting and typing to both the application layer and the transparent layer. This view shows that transparent layer 380 virtually resides on top of application layer 390. Using the processes and steps shown in FIGS. 4-8, the system distinguishes between user inputs directed to transparent layer 380 and those inputs directed to application layer 390. Further, the system distinguishes between user inputs that are gesture type inputs and user inputs that are handwriting type inputs. Gesture type inputs allow the user to control touch screen device 300 based on a user input, or touch, provided by the user to the device using an input device 350. Types of gestures include gestures to "pan" to scroll the virtual window appearing on the touch screen surface and view another part of the virtual screen, "zoom" to make an item on the touch screen device appear larger or smaller, "rotate" to move an item, such as a picture or map, in a circular direction, and view menus and other device interaction items.

The system identifies the intended interaction layer (transparent layer or application layer) based on properties of the user inputs received at the system as well as the type of input (handwriting or gesture) intended by the user based on the properties of the user inputs. User inputs identified as being intended to the transparent layer are directed to the transparent layer, while inputs identified as being intended to the application layer are directed to the application layer or, more specifically, an application appearing in the application layer. Inputs identified as gestures are treated as such in the intended interaction layer. For example, a "pan" gesture directed to the transparent layer would pan the virtual window appearing on touch screen device 300, such as to make other applications that are currently "off screen" be "on screen" and visible to the user. The same "pan" gesture directed to the application layer would pan the application in the application layer, such as scrolling a list of items that appears in the application. Likewise, user inputs identified as handwriting are treated as such. If directed to a textual input field, the handwriting is converted to its corresponding text (e.g., a handwritten "a" is converted to a textual "a", etc.) and inputted to the system as textual data. In this manner, the user can direct handwritten user input to an entry fields in an application and the system will not only identify that the input is intended for the application layer, but also recognize that the handwriting is intended as input to the fields, convert the handwriting to text, and input the text in the entry fields.

Figure 4:
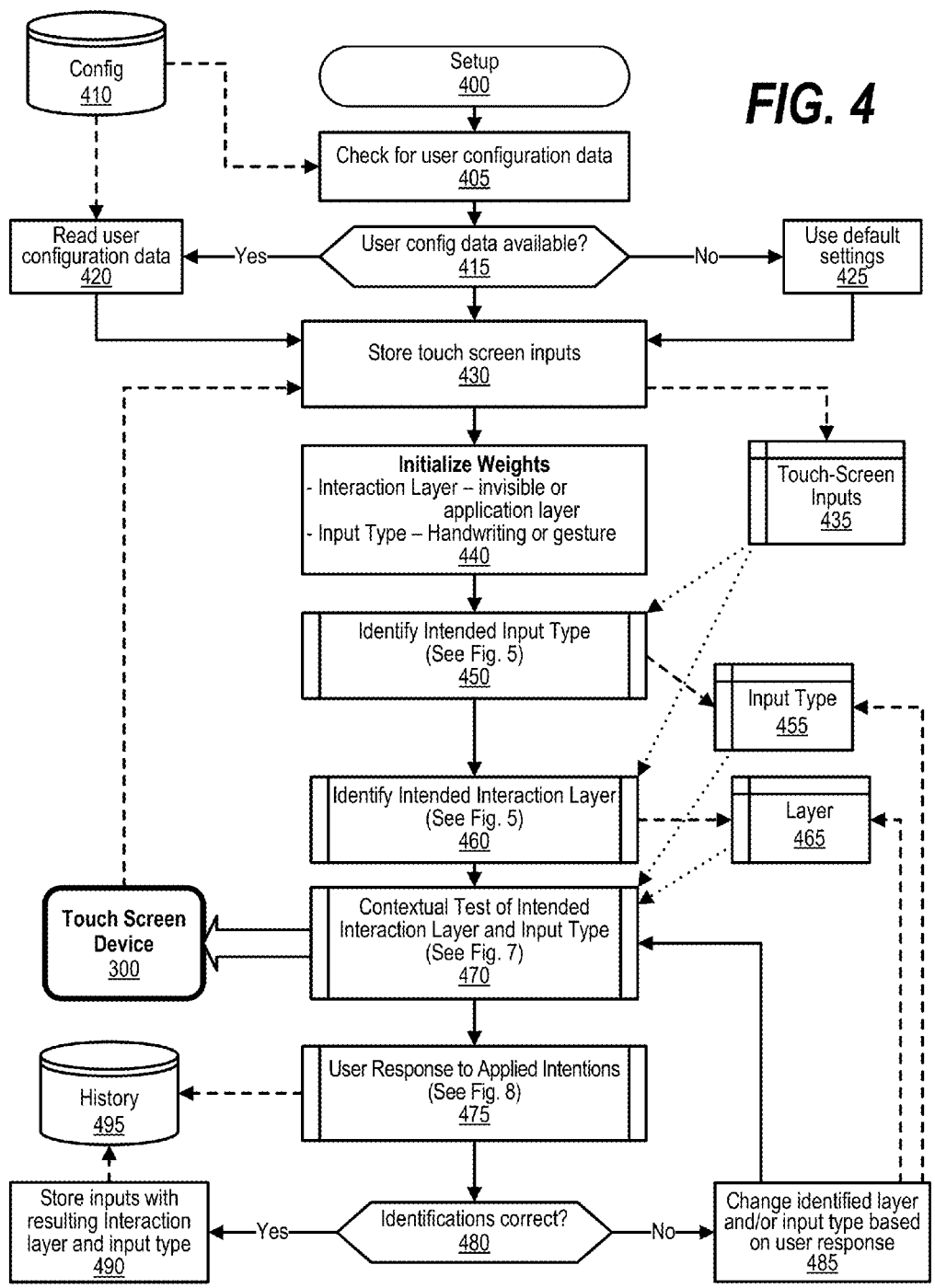
FIG. 4 is a flowchart showing steps taken by a setup process.

FIG. 4 is a flowchart showing steps taken by a setup process. FIG. 4 commences at 400 and shows the steps taken by a process that identifies both the intended input type and the intended target layer based on user inputs received at a touch screen device. At step 405, the process checks for user configuration data that may have been established by the user and stored in configuration data store 410. The process determines as to whether configuration setting have been established by the user (decision 415). If user configuration settings are available, then decision 415 branches to the 'yes' branch, whereupon, at step 420, the process reads the user configuration settings established by the user. On the other hand, if the user has not established configuration settings, then decision 415 branches to the 'no' branch, whereupon, at step 425, the process uses default settings rather than user defined configuration settings.

At step 430, the process stores the user inputs received at touch screen device 300 in memory area 435. At step 440, the process initializes weights for the intended interaction layer and the intended input type. The intended interaction layer is either the transparent layer or the application layer and the intended input type is either a handwriting type of input or a gesture type of input. As user inputs are processed by predefined processes 450 and 460, the weights are adjusted based on properties associated with the received user inputs. The option with the higher weight is selected as the user's intended option. For example, if, after performing predefined process 450, the gesture type input has a higher weight than the handwriting type input, then the gesture type input is identified as the user's intended input type. Likewise, if, after performing predefined process 460, the application layer has a higher weight than the transparent layer, then the application layer is identified as the user's intended interaction layer.

Figure 5:
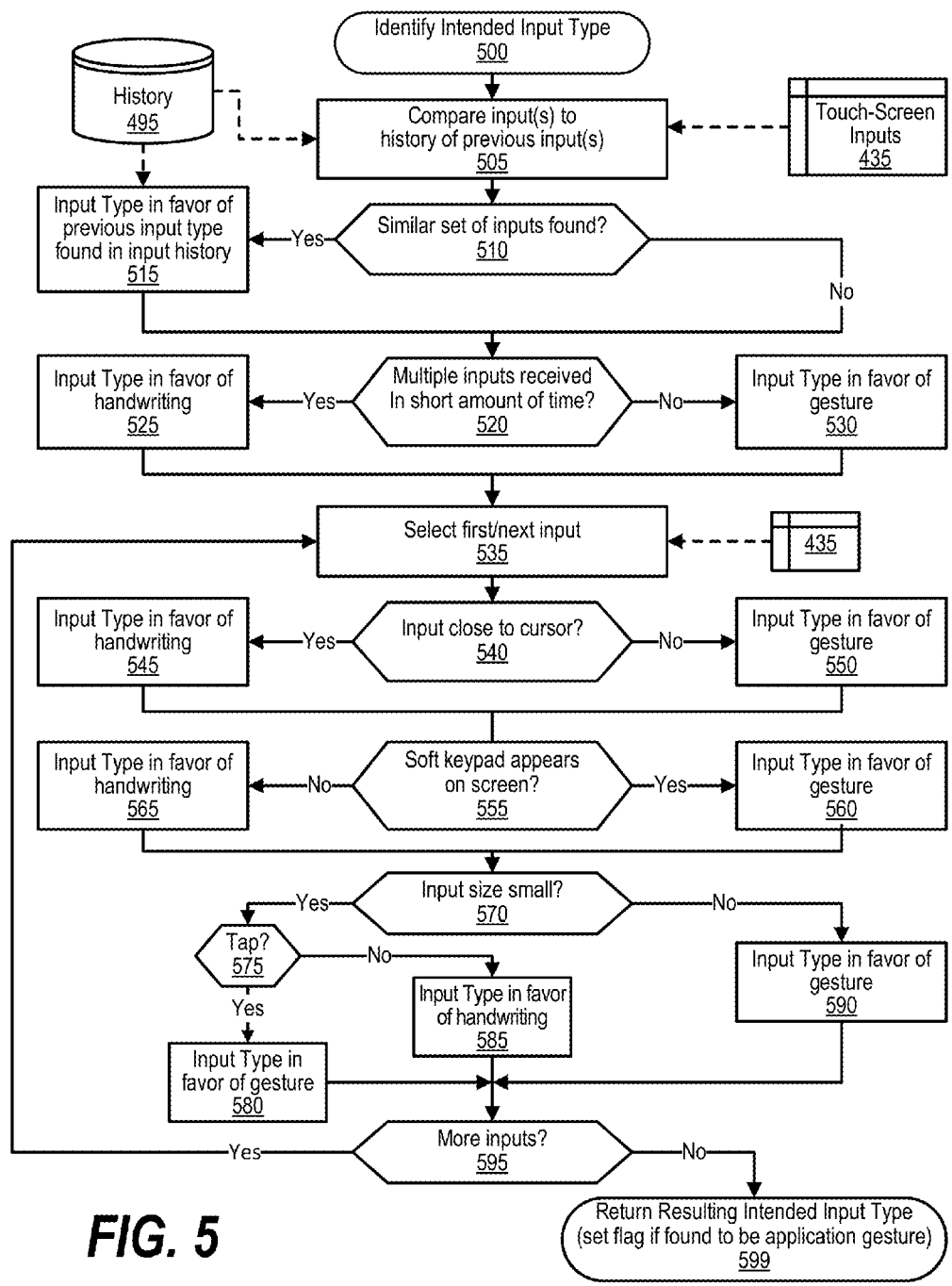
FIG. 5 is a flowchart showing steps taken by a process that identifies an intended input type for received touch-screen inputs.

At predefined process 450, the process performs the Identify Intended Input Type routine (see FIG. 5 and corresponding text for processing details). The intended input type identified by predefined process 450 is stored in memory area 455. The intended input type is identified as either being a gesture input type or a handwriting input type.

Figure 6:
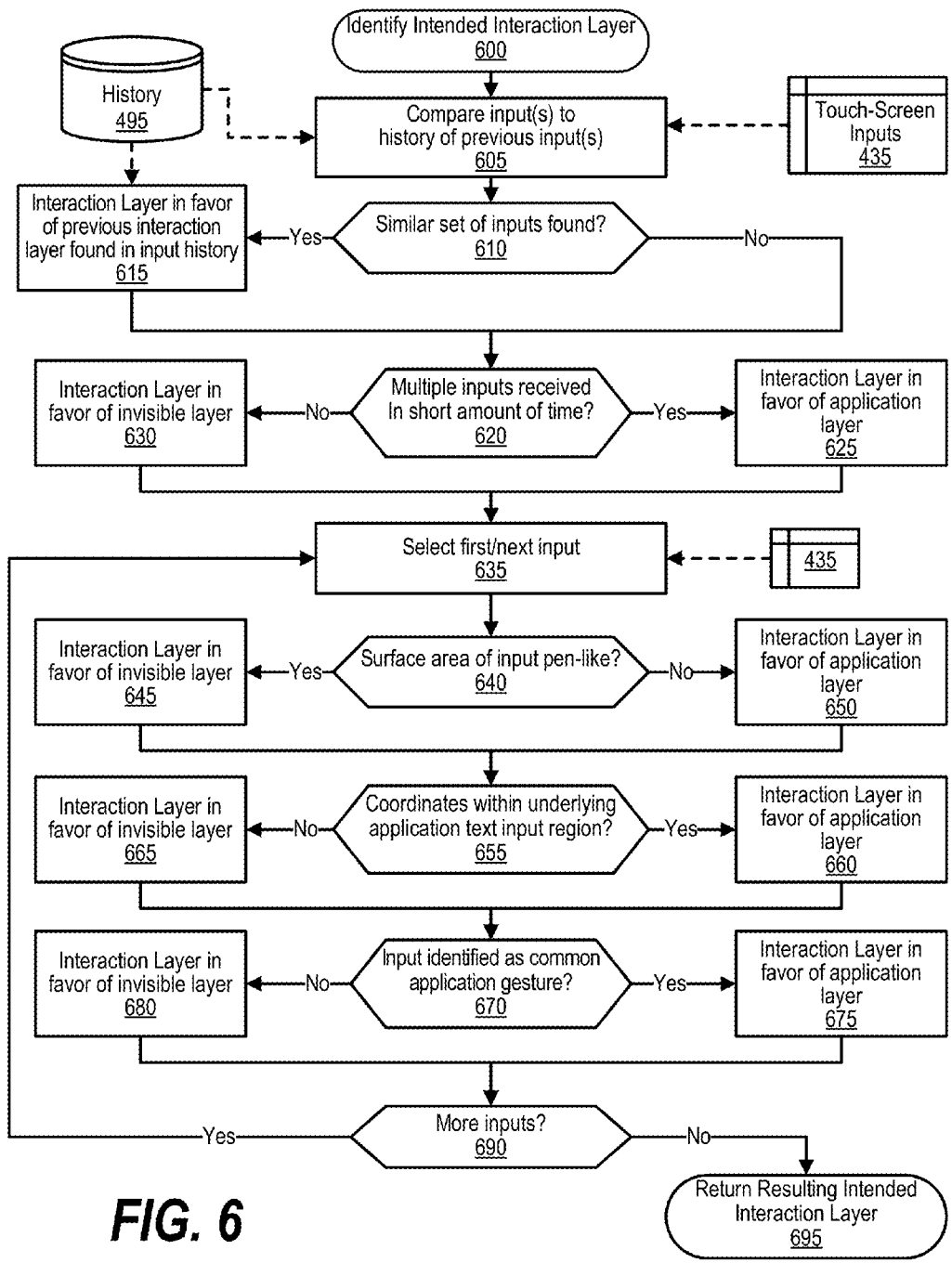
FIG. 6 is a flowchart showing steps taken by a process that identifies an intended target layer for received touch-screen inputs.

At predefined process 460, the process performs the Identify Intended Interaction Layer routine (see FIG. 6 and corresponding text for processing details). The intended interaction layer identified by predefined process 460 is stored in memory area 465. The intended interaction layer is identified as either being the transparent layer or the application layer.

Figure 7:
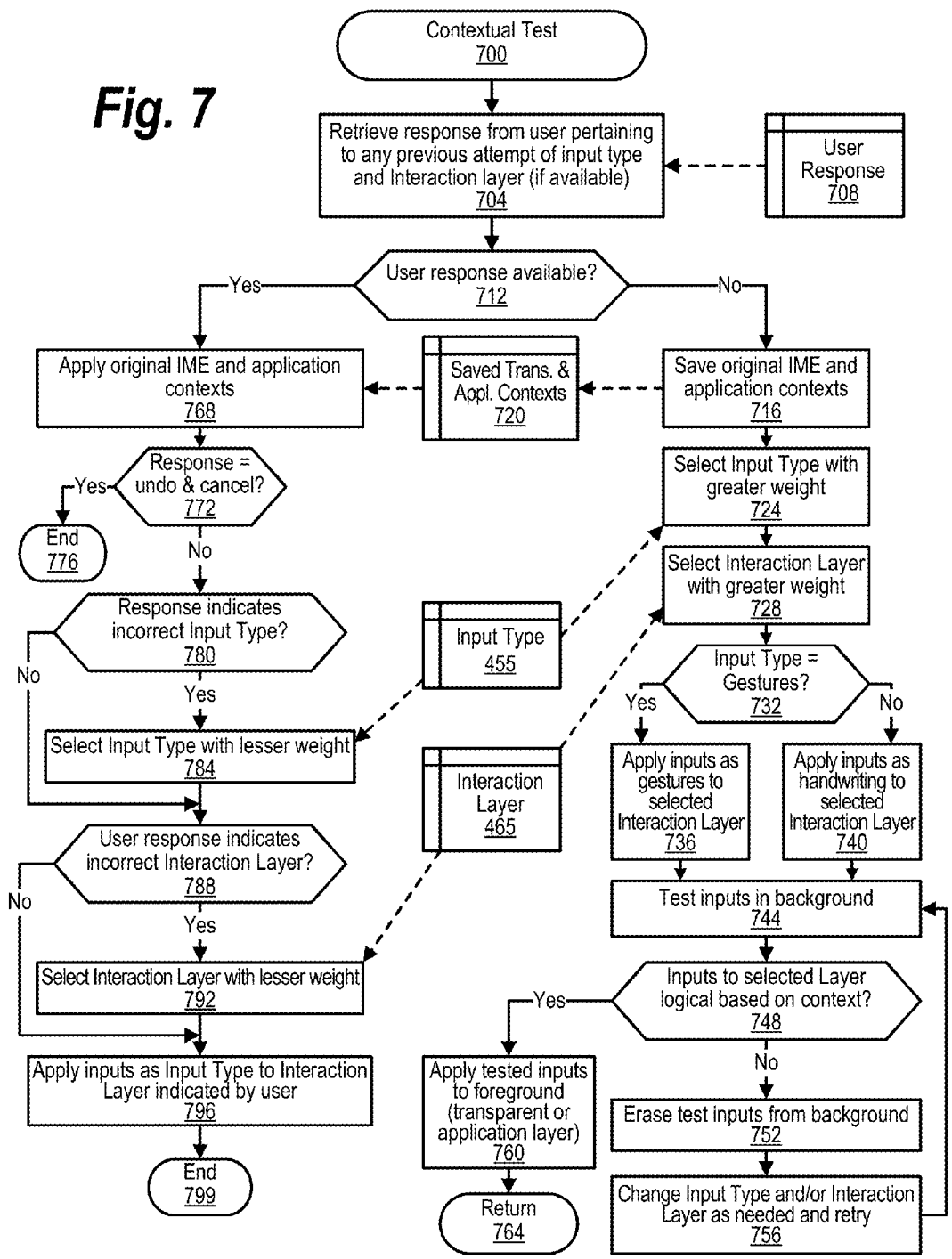
FIG. 7 is a flowchart showing steps taken during a contextual test of the touch-screen inputs in the identified input type and directed to the identified target layer.

At predefined process 470, the process performs the Contextual Test of Intended Target Layer and Input Type routine (see FIG. 7 and corresponding text for processing details). The contextual test applies the user input to the identified interaction layer as the intended input type (handwriting or gestures). The results of the contextual test appear on touch screen device where they are visible to the user. At predefined process 475, the process performs the User Response to Applied Intentions routine (see FIG. 8 and corresponding text for processing details). When the user views the results of the contextual step performed in predefined process 470, the user can indicate whether the intended interaction layer was incorrect, the intended input type was incorrect, or both were incorrect. This response is received from the user at predefined process 475. For example, the device could be configured so that if the user shakes the device from side to side within a predetermined time interval after the contextual test is performed, the user response indicates that the intended interaction layer is incorrect, shaking up and down within the interval indicates that the intended input type is incorrect, and shaking the device diagonally indicate that both the intended interaction layer and the intended input type are incorrect.

The process determines as to whether the identifications regarding both the intended interaction layer and the intended input type were correct (decision 480). If one or more identifications were incorrect, then decision 480 branches to the 'no' branch, whereupon, at step 485, the process changes the identified interaction layer and/or the identified input type based on the user response (e.g., shaking device up/down, left/right, diagonally, etc. within predetermined time interval). For example, if predefined process 450 incorrectly identified the intended input type as being a gesture, then the intended input type would be changed to a handwriting input type at step 485. Likewise, if predefined process 460 incorrectly identified the intended interaction layer as being the transparent layer, then the intended interaction layer would be changed to the application layer at step 485.

Processing then loops back to predefined process 470 to re-perform the contextual test of the updated intended input type and/or intended interaction layer. This looping continues until the identifications of the user's intentions are correct. When both identifications of both the intended input type and the intended interaction layer are correct, then decision 480 branches to the 'yes' branch, whereupon, at step 490, the process stores the user inputs along with the resulting identified intended interaction layer and the identified intended input type in history data store 495. The history data is compared to user inputs to find similarities in user inputs so that previously validated identifications of intended input types and intended interaction layers can be used in subsequent uses of the device.

FIG. 5 is a flowchart showing steps taken by a process that identifies an intended input type for received touch-screen inputs. At step 500, the process identifies the Intended Input Type based on user inputs at the touch screen device. At step 505, the process compares the received user input to history data of previous user inputs that have been processed and the intended input type associated with such previous user inputs. The process determines as to whether similar set of inputs were found in the history data (decision 510). If similar set of inputs were found in the history data, then decision 510 branches to the 'yes' branch whereupon, at step 515, the process weights the input type (handwriting or gesture) in favor of the previous input type found in the input history that was associated with the similar set of user inputs. On the other hand, if a similar set of inputs was not found in the history data, then decision 510 branches to the 'no' branch bypassing step 515.

The process determines as to whether multiple user inputs were received in a relatively short amount of time (decision 520). If multiple inputs were received in a relatively short amount of time, then decision 520 branches to the 'yes' branch whereupon, at step 525, the weighting of the handwriting input type is increased. On the other hand, if multiple inputs were not received in a short amount of time, then decision 520 branches to the 'no' branch whereupon, at step 525, the weighting of the gesture input type is increased.

At step 535, the process selects the first user input that was received from the user of the touch screen device. The process determines as to whether the selected user input has coordinate properties that place the selected user input proximate, or close to, the current coordinates of the cursor displayed on the screen (decision 540). If the selected user input is proximate to the current cursor position, then decision 540 branches to the 'yes' branch, whereupon at step 545, the weighting of the handwriting input type is increased. On the other hand, the selected user input is not proximate to the current cursor position, then decision 540 branches to the 'no' branch, whereupon at step 550 the weighting of the gesture input type is increased.

The process determines as to whether a soft keypad appeared on the screen at the same time that the user input was received (decision 555). If a soft keypad appeared on the screen at the same time that the user input was received, then decision 555 branches to the 'yes' branch whereupon, at step 560, the weighting of the gesture input type is increased. On the other hand, if a soft keypad did not appear on the screen at the same time that the user input was received, then decision 555 branches to the 'no' branch whereupon, at step 565, the weighting of the handwriting input type is increased.

The process determines as to whether the size of the user input is relatively small in comparison to the size of the touch enabled screen (decision 570). If the size of the user input is relatively small, then decision 570 branches to the 'yes' branch for further processing. On the other hand, if the size of the user input is not relatively small, then decision 570 branches to the 'no' branch whereupon, at step 590 the weighting of the gesture input type is increased. Following the 'yes' branch from decision 570, the process next determines as to whether the user input is a tap on the screen (decision 575). If the user input is a tap on the screen, then decision 575 branches to the 'yes' branch whereupon, at step 580, the weighting of the gesture input type is increased. On the other hand, if the user input is not a tap on the screen, then decision 575 branches to the 'no' branch whereupon, at step 585 the weighting of the handwriting input type is increased.

The process determines as to whether more user inputs that were received from the user at the touch screen device (decision 595). If there are more user inputs, then decision 595 branches to the 'yes' branch which loops back to step 535 to select and process the next user input. This looping continues until there are no more user inputs to process, at which point decision 595 branches to the 'no' branch and processing returns to the calling routine (see FIG. 4) at 599. The routine returns the intended input type based upon which of the input types (handwriting or gesture) received the most weight during execution of the routine.

FIG. 6 is a flowchart showing steps taken by a process that identifies an intended interaction layer for received touch-screen inputs. At step 600, the process identifies the Intended Interaction Layer based on user inputs received at the touch screen device. At step 605, the process compares the received user input to history data of previous user inputs that have been processed and the intended interaction layer associated with such previous user inputs. The process determines as to whether similar set of inputs were found in the history data (decision 610). If similar set of inputs were found in the history data, then decision 610 branches to the 'yes' branch whereupon, at step 615, the process weights the intended interaction layer (transparent layer or application layer) in favor of previous intended interaction layer found in the input history that was associated with the similar set of user inputs. On the other hand, if a similar set of inputs was not found in the history data, then decision 610 branches to the 'no' branch bypassing step 615.

The process determines as to whether multiple user inputs were received in a relatively short amount of time (decision 620). If multiple inputs were received in a relatively short amount of time, then decision 620 branches to the 'yes' branch whereupon, at step 625, the weighting of the application layer is increased. On the other hand, if multiple inputs were not received in a short amount of time, then decision 620 branches to the 'no' branch whereupon, at step 625, the weighting of the transparent layer is increased.

At step 635, the process selects the first user input from the set of user inputs received at the touch screen device. At decision 640, a determination is made by the process as to whether the surface area of the input has a shape and size consistent with a pen-like implement (e.g., stylus, pen, etc.) which is smaller than the surface area of an input that was made with a finger or other non-pen like implement. If the surface area of the selected input is from a pen-like implement, then decision 640 branches to the 'yes' branch whereupon, at step 645, the weighting of the transparent layer is increased. On the other hand, if the surface area of the selected input is not from a pen-like implement, then decision 640 branches to the 'no' branch whereupon, at step 650, the weighting of the application layer is increased.

The process determines as to whether the selected input has coordinates that are within underlying application text input region (decision 655). If the coordinates are proximate, or within, an underlying application area, then decision 655 branches to the 'yes' branch whereupon, at step 660 the weighting of the application layer is increased. On the other hand, if the coordinates are not proximate, or within, an underlying application area, then decision 655 branches to the 'no' branch whereupon, at step 665, the weighting of the transparent layer is increased.

The process determines as to whether the selected input was previously identified as common application gesture by the routine shown in FIG. 5 (decision 670). If the selected input was previously identified as common application gesture, then decision 670 branches to the 'yes' branch whereupon, at step 675, the weighting of the application layer is increased. On the other hand, the selected input was not previously identified as common application gesture, then decision 670 branches to the 'no' branch whereupon, at step 680, the weighting of the transparent layer is increased.

The process determines as to whether more user inputs that were received from the user at the touch screen device (decision 690). If there are more user inputs, then decision 690 branches to the 'yes' branch which loops back to step 635 to select and process the next user input. This looping continues until there are no more user inputs to process, at which point decision 690 branches to the 'no' branch and processing returns to the calling routine (see FIG. 4) at 695. The routine returns the intended interaction layer based upon which of the interaction layers (transparent layer or application layer) received the most weight during execution of the routine.

FIG. 7 is a flowchart showing steps taken during a contextual test of the touch-screen inputs in the identified input type and directed to the identified target layer. FIG. 7 commences at 700 and shows the steps taken by a process that performs a contextual test. At step 704, the process retrieves a response from memory area 708 pertaining to any previous attempt of input type and interaction layer (if available). The process determines as to whether a user response is available (decision 712). If a user response is not available, then decision 712 branches to the 'no' branch to perform steps 716 through 764. At step 716, the process saves original system and application contexts. At step 724, the process selects the input type (handwriting or gesture) that received the greater weight during the processing shown in FIG. 5. At step 728, the process selects interaction layer (transparent layer or application layer) that received the greater weight during the processing shown in FIG. 6. The process determines as to whether the input type is the "gestures" input type (decision 732). If the input type is the "gestures" input type, then decision 732 branches to the 'yes' branch whereupon, at step 736, the process applies the inputs as gestures to selected interaction layer (either the transparent or the applications layer). On the other hand, the input type is not "gestures" (but instead is "handwriting"), then decision 732 branches to the 'no' branch, whereupon, at step 740, the process applies the inputs as handwriting to the selected interaction layer (either transparent or application layer).

At step 744, the process tests the inputs in the background without the results of the inputs being visible on the screen. The process determines as to whether inputs to selected interaction layer are logical based on the context (decision 748). If the inputs to the selected interaction layer are logical based on the context, then decision 748 branches to the 'yes' branch. On the other hand, if the inputs to the selected interaction layer are not logical based on the context, then decision 748 branches to the 'no' branch. At step 752, the process erases the test inputs from the background. At step 756, the process changes the input type and/or the interaction layer as needed and re-tests the inputs in the background by looping back to step 744. At step 760, the process applies the tested inputs to the foreground (transparent or application layer). Processing then returns to the calling routine (see FIG. 4) at 764.

Returning to decision 712, if a user response is available, then decision 712 branches to the 'yes' branch to perform steps 768 though 799. At step 768, the process applies the original system and application contexts to the device. The process determines as to whether the user response was to undo and cancel the changes made to the device (decision 772). For example, the device could be configured so that if the user flips the device around during the predetermined time interval, the response is deemed to be to undo and cancel the changes. If the user response was to undo and cancel the changes made to the device, then decision 772 branches to the 'yes' branch and processing ends at 776.

On the other hand, if the user response was not to undo and cancel the changes made to the device, then decision 772 branches to the 'no' branch for further processing. The process determines as to whether response indicates an incorrect intended input type (decision 780). For example, the device can be configured so that shaking the device up and down within the time interval indicates that the intended input type is incorrect. If the response received from the user indicates an incorrect intended input type, then decision 780 branches to the 'yes' branch whereupon, at step 784, the process selects the other input type (the one with the lesser weight). On the other hand, if the response received from the user does not indicate an incorrect intended input type, then decision 780 branches to the 'no' branch bypassing step 784. The process determines as to whether user response indicates that the identified intended interaction layer is incorrect (decision 788). For example, the device could be configured so that if the user shakes the device from side to side within a predetermined time interval after the contextual test is performed, the user response indicates that the intended interaction layer is incorrect. If the user response indicates that the identified intended interaction layer is incorrect, then decision 788 branches to the 'yes' branch whereupon, at step 792, the intended interaction layer with the lesser weight is selected (the other interaction layer). On the other hand, if the user response does not indicate that the identified intended interaction layer is incorrect, then decision 788 branches to the 'no' branch bypassing step 792. At step 796, the process applies the user inputs as the selected input type to the selected interaction layer as indicated by user. Processing thereafter ends at 799.

Figure 8:
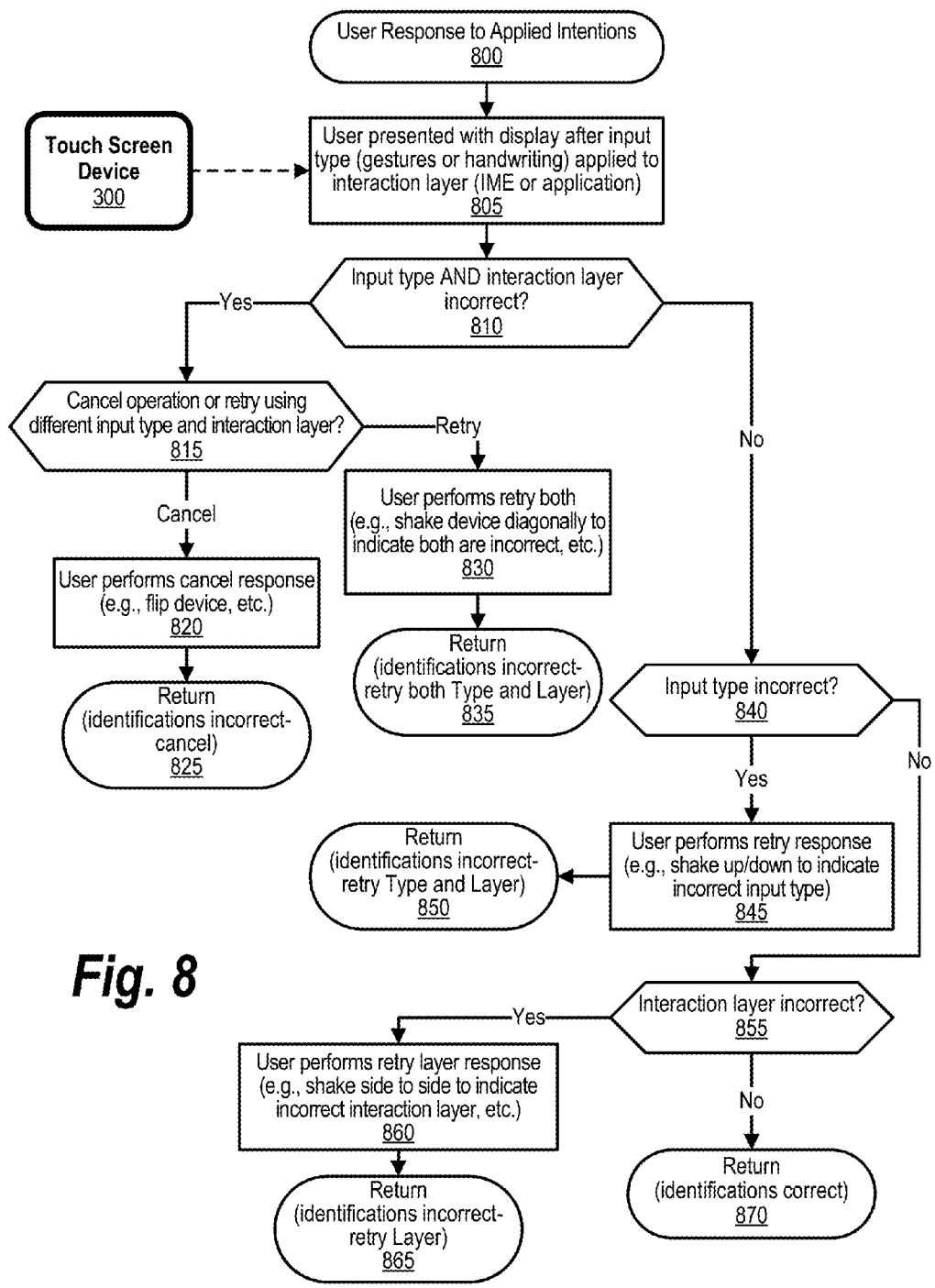
FIG. 8 is a flowchart showing steps taken to handle user responses to the touch-screen inputs being applied as an identified input type to the identified target layer.

FIG. 8 is a flowchart showing steps taken to handle user responses to the touch-screen inputs being applied as an identified input type to the identified target layer. At step 805, the process presents the user with a display that shows the results after the identified input type (gestures or handwriting) have been applied to the identified interaction layer (transparent or application). The process determines as to whether the identified intended input type and the identified intended interaction layer are both incorrect (decision 810). If the identified intended input type and the identified intended interaction layer are both incorrect, then decision 810 branches to the 'yes' branch to perform steps 815 through 835.

The process determines as to whether cancel the operation or retry the inputs using a different input type and interaction layer (decision 815). If the user wishes to cancel the operation, then decision 815 branches to the 'yes' branch whereupon, at step 820, the user performs the cancel response (e.g., flip device over, etc.) and FIG. 8 processing thereafter returns to the calling routine (see FIG. 4) at 825 indicating that the user wishes to cancel the operation.

On the other hand, if the user wishes to retry the inputs using the other input type and the other interaction layer, then decision 815 branches to the 'no' branch whereupon, at step 830, the user performs the retry response (e.g., shake device diagonally to indicate both the input type and interaction layer are incorrect, etc.) and FIG. 8 processing thereafter returns to the calling routine (see FIG. 4) at 835 with the response indicating that both the identified intended input type and the identified intended interaction layer were incorrect.

Returning to decision 810, if both the identified intended input type and the identified intended interaction layer are not incorrect, then decision 810 branches to the 'no' branch to perform steps 840 through 870. The user determines as to whether the identified intended input type was incorrect (decision 840). If the identified intended input type was incorrect, then decision 840 branches to the 'yes' branch whereupon, at step 845, the user performs a response such as shaking the device up/down to indicate that the identified intended input type is incorrect and processing returns to the calling routine (see FIG. 4) at 850 with an indication that the identified intended input type was incorrect.

On the other hand, if the identified intended input type is correct, then decision 840 branches to the 'no' branch bypassing step 845. The user determines as whether the identified intended interaction layer is incorrect (decision 855). If the identified intended interaction layer is incorrect, then decision 855 branches to the 'yes' branch whereupon, at step 860, the user performs a response, such as shaking the device from side to side to indicate that the identified intended interaction layer is incorrect and processing returns to the calling routine (see FIG. 4) at 865 with an indication that the identified intended interaction layer was incorrect.

On the other hand, if the identified intended interaction layer is correct, then decision 855 branches to the 'no' branch bypassing step 860 and processing returns to the calling routine (see FIG. 4) at 870 indicating that both the identification of the intended input type and the intended interaction layer are both correct. In one embodiment, if no response is received from the user within a predetermined time interval (e.g., three seconds, etc.) then the identified intended input type and the identified intended interaction layer are deemed to both be correct.

While particular embodiments have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to others containing only one such element, even when the same claim includes the introductory phrases "one or more" or "at least one" and indefinite articles such as "a" or "an"; the same holds true for the use in the claims of definite articles.

What is claimed is:

1. A method comprising:
   receiving one or more user inputs at a touch-screen of a device, wherein each user input includes a set of one or more input properties, and wherein the touch-screen includes a plurality of interaction layers that include a transparent layer and an application layer;
   identifying an intended interaction layer from the plurality of interaction layers based on an analysis of the input properties, wherein the analysis selects the intended interaction layer corresponding to a previous intended interaction layer that was based on a previously received set of weighted user inputs; and
   directing the user inputs to the identified intended interaction layer.

2. The method of claim 1 further comprising:
comparing the received user inputs to the plurality of sets of previously received user inputs, wherein each of the sets of previously received user inputs corresponds to the previous intended interaction layer;
selecting, based on the comparison, one of the sets of previously received user inputs; and
weighting the intended interaction layer towards the previous intended interaction layer associated with the selected set of previously received user inputs, wherein the identification of the intended interaction layer is based upon the weighting applied to the transparent layer and the application layer.

3. The method of claim 1 further comprising:
identifying an amount of time during which the one or more user inputs were received at the touch screen, wherein the one or more user inputs included a plurality of user inputs; and
weighting the intended interaction layer towards the application layer in response to the amount of time being a predetermined amount of time, wherein the identification of the intended interaction layer is based upon the weighting applied to the transparent layer and the application layer.

4. The method of claim 1 further comprising:
retrieving one or more user configuration settings that indicate a first user preferred interaction layer for pen-like inputs and a second user preferred interaction layer for finger-like inputs, wherein the first and second user preferred interaction layers are selected from the group consisting of the transparent layer and the application layer;
identifying an input implement used to create the user inputs, wherein the identifying is based on a detected surface area width of the user inputs on the touch-screen;
weighting the intended interaction layer towards the first user preferred interaction layer in response to identifying that the input implement is a pen-like implement; and
weighting the intended interaction layer towards the second user preferred interaction layer in response to identifying that the input implement is a finger implement, wherein the identification of the intended interaction layer is based upon the weighting applied to the transparent layer and the application layer.

5. The method of claim 1 further comprising:
identifying one or more sets of coordinates on the touch-screen, wherein each of the sets of coordinates corresponds one of the one or more user inputs;
retrieving an application layer set of coordinates on the touch-screen, wherein the application layer set of coordinates correspond to a screen area where the application layer is displayed;
comparing the sets of coordinates with the application layer set of coordinates; and
weighting the intended interaction layer towards the application layer in response to comparison revealing that the sets of coordinates are proximate to the application layer set of coordinates, wherein the identification of the intended interaction layer is based upon the weighting applied to the transparent layer and the application layer.

6. The method of claim 1 further comprising:
retrieving a plurality of common application gestures that correspond to the application layer;
comparing the received user inputs to the plurality of common application gestures; and
weighting the intended interaction layer towards the application layer in response to comparison revealing that the received user inputs match one or more of the common application gestures, wherein the identification of the intended interaction layer is based upon the weighting applied to the transparent layer and the application layer.

7. The method of claim 1 further comprising:
saving a state of the identified intended interaction layer prior to the directing;
within a predetermined time interval after directing the user inputs to the identified intended interaction layer, receiving a user response at the device indicating an incorrect identification;
in response to receiving the user response within the predetermined time interval:
retrieving the saved state of the identified intended interaction layer; and
reverting the intended interaction layer back to the saved state.

8. An information handling system comprising:
one or more processors;
a touch-screen accessible by at least one of the processors;
a memory coupled to at least one of the processors; and
a set of instructions stored in the memory and executed by at least one of the processors to:
receive one or more user inputs at a touch-screen of a device, wherein each user input includes a set of one or more input properties, and wherein the touch-screen includes a plurality of interaction layers that include a transparent layer and an application layer;
identify an intended interaction layer from the plurality of interaction layers based on an analysis of the input properties, wherein the analysis selects the intended interaction layer corresponding to a previous intended interaction layer that was based on a previously received set of weighted user inputs; and
direct the user inputs to the identified intended interaction layer.

9. The information handling system of claim 8 wherein the set of instructions further comprise instructions to:
compare the received user inputs to the plurality of sets of previously received user inputs, wherein each of the sets of previously received user inputs corresponds to the previous intended interaction layer;
select, based on the comparison, one of the sets of previously received user inputs; and
weight the intended interaction layer towards the previous intended interaction layer associated with the selected set of previously received user inputs, wherein the identification of the intended interaction layer is based upon the weight applied to the transparent layer and the application layer.

10. The information handling system of claim 8 wherein the set of instructions further comprise instructions to:
identify an amount of time during which the one or more user inputs were received at the touch screen, wherein the one or more user inputs included a plurality of user inputs; and
weight the intended interaction layer towards the application layer in response to the amount of time being a predetermined amount of time, wherein the identification of the intended interaction layer is based upon the weight applied to the transparent layer and the application layer.

11. The information handling system of claim 8 wherein the set of instructions further comprise instructions to:
  retrieve one or more user configuration settings that indicate a first user preferred interaction layer for pen-like inputs and a second user preferred interaction layer for finger-like inputs, wherein the first and second user preferred interaction layers are selected from the group consisting of the transparent layer and the application layer;
  identify an input implement used to create the user inputs, wherein the identifying is based on a detected surface area width of the user inputs on the touch-screen;
  weight the intended interaction layer towards the first user preferred interaction layer in response to identifying that the input implement is a pen-like implement; and
  weight the intended interaction layer towards the second user preferred interaction layer in response to identifying that the input implement is a finger implement, wherein the identification of the intended interaction layer is based upon the weight applied to the transparent layer and the application layer.

12. The information handling system of claim 8 wherein the set of instructions further comprise instructions to:
  identify one or more sets of coordinates on the touch-screen, wherein each of the sets of coordinates corresponds one of the one or more user inputs;
  retrieve an application layer set of coordinates on the touch-screen, wherein the application layer set of coordinates correspond to a screen area where the application layer is displayed;
  compare the sets of coordinates with the application layer set of coordinates; and
  weight the intended interaction layer towards the application layer in response to comparison revealing that the sets of coordinates are proximate to the application layer set of coordinates, wherein the identification of the intended interaction layer is based upon the weight applied to the transparent layer and the application layer.

13. The information handling system of claim 8 wherein the set of instructions further comprise instructions to:
  retrieve a plurality of common application gestures that correspond to the application layer;
  compare the received user inputs to the plurality of common application gestures; and
  weight the intended interaction layer towards the application layer in response to comparison revealing that the received user inputs match one or more of the common application gestures, wherein the identification of the intended interaction layer is based upon the weight applied to the transparent layer and the application layer.

14. The information handling system of claim 8 wherein the set of instructions further comprise instructions to:
  save a state of the identified intended interaction layer prior to the directing;
  within a predetermined time interval after directing the user inputs to the identified intended interaction layer, receive a user response at the device indicating an incorrect identification;
  in response to reception of the user response within the predetermined time interval:
    retrieve the saved state of the identified intended interaction layer; and
    revert the intended interaction layer back to the saved state.

15. A computer program product comprising:
  a computer readable storage medium comprising a set of computer instructions, the computer instructions effective to:
    receive one or more user inputs corresponding to at a touch-screen, wherein each user input includes a set of one or more input properties, and wherein the touch-screen includes a plurality of interaction layers that include a transparent layer and an application layer;
    identify an intended interaction layer from the plurality of interaction layers based on an analysis of the input properties, wherein the analysis selects the intended interaction layer corresponding to a previous intended interaction layer that was based on a previously received set of weighted user inputs; and
    direct the user inputs to the identified intended interaction layer.

16. The computer program product of claim 15 wherein the set of instructions comprise additional instructions effective to:
  compare the received user inputs to the plurality of sets of previously received user inputs, wherein each of the sets of previously received user inputs corresponds to the previous intended interaction layer;
  select, based on the comparison, one of the sets of previously received user inputs; and
  weighting the intended interaction layer towards the previous intended interaction layer associated with the selected set of previously received user inputs, wherein the identification of the intended interaction layer is based upon the weight applied to the transparent layer and the application layer.

17. The computer program product of claim 15 wherein the set of instructions comprise additional instructions effective to:
  identify an amount of time during which the one or more user inputs were received at the touch screen, wherein the one or more user inputs included a plurality of user inputs; and
  weight the intended interaction layer towards the application layer in response to the amount of time being a predetermined amount of time, wherein the identification of the intended interaction layer is based upon the weight applied to the transparent layer and the application layer.

18. The computer program product of claim 15 wherein the set of instructions comprise additional instructions effective to:
  retrieve one or more user configuration settings that indicate a first user preferred interaction layer for pen-like inputs and a second user preferred interaction layer for finger-like inputs, wherein the first and second user preferred interaction layers are selected from the group consisting of the transparent layer and the application layer;
  identify an input implement used to create the user inputs, wherein the identifying is based on a detected surface area width of the user inputs on the touch-screen;
  weight the intended interaction layer towards the first user preferred interaction layer in response to identifying that the input implement is a pen-like implement; and
  weight the intended interaction layer towards the second user preferred interaction layer in response to identifying that the input implement is a finger implement, wherein the identification of the intended interaction layer is based upon the weight applied to the transparent layer and the application layer.

19. The computer program product of claim 15 wherein the set of instructions comprise additional instructions effective to:
- identify one or more sets of coordinates on the touch-screen, wherein each of the sets of coordinates corresponds one of the one or more user inputs;
- retrieve an application layer set of coordinates on the touch-screen, wherein the application layer set of coordinates correspond to a screen area where the application layer is displayed;
- compare the sets of coordinates with the application layer set of coordinates; and
- weight the intended interaction layer towards the application layer in response to comparison revealing that the sets of coordinates are proximate to the application layer set of coordinates, wherein the identification of the intended interaction layer is based upon the weight applied to the transparent layer and the application layer.

20. The computer program product of claim 15 wherein the set of instructions comprise additional instructions effective to:
- retrieve a plurality of common application gestures that correspond to the application layer;
- compare the received user inputs to the plurality of common application gestures; and
- weight the intended interaction layer towards the application layer in response to comparison revealing that the received user inputs match one or more of the common application gestures, wherein the identification of the intended interaction layer is based upon the weight applied to the transparent layer and the application layer.

* * * * *